United States Patent [19]
Donoghue

[11] 3,936,665
[45] Feb. 3, 1976

[54] SHEET MATERIAL CHARACTERISTIC MEASURING, MONITORING AND CONTROLLING METHOD AND APPARATUS USING DATA PROFILE GENERATED AND EVALUATED BY COMPUTER MEANS

[75] Inventor: John Francis Donoghue, Columbus, Ohio

[73] Assignee: Industrial Nucleonics Corporation, Columbus, Ohio

[22] Filed: Apr. 29, 1974

[21] Appl. No.: 464,947

Related U.S. Application Data
[63] Continuation of Ser. No. 261,998, June 12, 1972, abandoned.

[52] U.S. Cl. ............ 235/151.3; 162/252; 235/151.1
[51] Int. Cl.² ................... G05B 15/02; G06F 15/46
[58] Field of Search ....... 235/151.3, 151.35, 151.13, 235/150.1, 151.1; 444/1; 425/140, 141, 145, 162, 171, 172; 73/159; 264/40; 162/016.6, 198, 252, 258, 259, 263

[56] References Cited
UNITED STATES PATENTS

| | | |
|---|---|---|
| 3,307,215 | 3/1967 | Gerhard et al. .............. 235/151.3 X |
| 3,510,374 | 5/1970 | Walker .......................... 162/259 X |
| 3,552,203 | 1/1971 | Freeh ................................ 73/159 |
| 3,610,897 | 10/1971 | Gerhard et al. ............. 235/151.3 X |
| 3,626,165 | 12/1971 | McCall .......................... 235/151.3 |

*Primary Examiner*—Joseph F. Ruggiero
*Attorney, Agent, or Firm*—Allan M. Lowe; William T. Fryer, III; Walter R. Nielsen

[57] ABSTRACT

A sheet material characteristic monitoring apparatus is provided for use in processes involving the production and contouring of sheet material. In a preferred embodiment, the sheet material characteristic is measured at two or more stationary cross direction locations of the sheet. A digital computer computes a regression equation between the measured values of the sheet characteristic and their respective locations, which equation is evaluated between limits representing the sheet edges to provide a data profile comprising estimated values of the sheet characteristic across the width of the sheet. The data profile may be derived substantially instantaneously. The data profile may further be evaluated between limits representing one or more desired transverse dimensions of the sheet.

26 Claims, 7 Drawing Figures

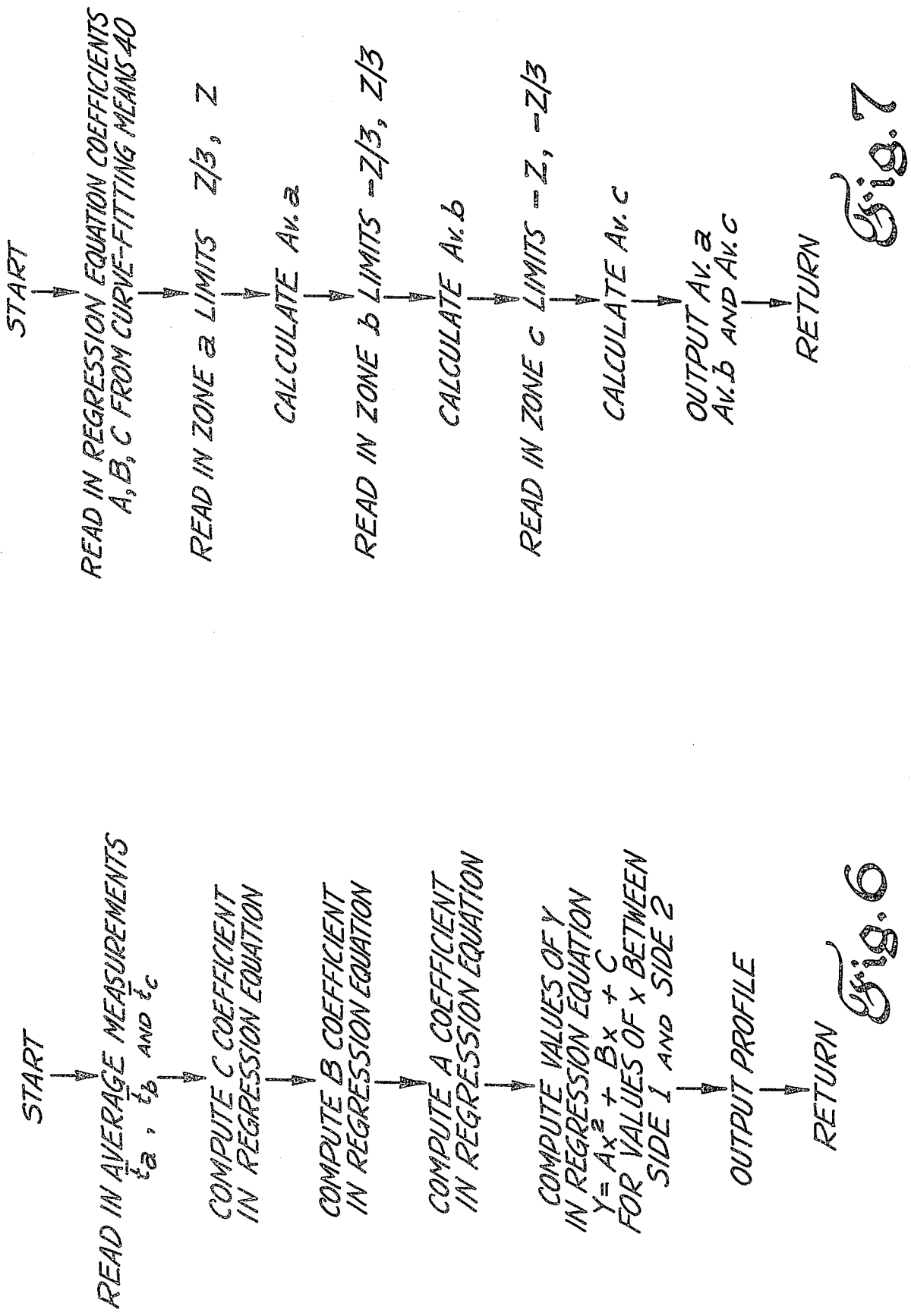

SHEET MATERIAL CHARACTERISTIC MEASURING, MONITORING AND CONTROLLING METHOD AND APPARATUS USING DATA PROFILE GENERATED AND EVALUATED BY COMPUTER MEANS

This is a continuation of application Ser. No. 261,998 filed June 12, 1972, now abandoned.

MEASURING GAUGE

The present invention relates generally to the production and contouring of sheet material, and more particularly to a sheet material monitoring apparatus, which includes a plurality of single point measuring means for measuring a characteristic of sheet material moving relative to the measuring means, and computer means for determining a data profile across said sheet material with respect to the measured characteristic. From the computed data profile, information may be derived for the purpose of controlling the process to a desired value of the characteristic.

CROSS REFERENCE TO RELATED APPLICATIONS

The present invention relates to the inventions disclosed in co-pending applications entitled "Process Control" of R. Heiks et al., U.S. Ser. No. 262,000, now U.S. Pat. No. 3,843,439 "Process Control" of J. Donoghue et al., U.S. Ser. No. 261,997, and "Process Control System" of J. Donoghue et al., U.S. Ser. No. 261,999, now U.S. Pat. No. 3,844,870, all assigned to the assignee of the present invention and filed on even date herewith.

BACKGROUND

In the arts relating to apparatus for the production and contouring of sheet material, such as rolling mills, paper making machines, rubber and plastic calenders, sheet coaters, and the like, it is of highly significant concern to control the sheet material so as to maintain one or more of its characteristics within precise limits. The production and/or contouring of sheet material within close tolerances is critical both from the standpoint of quality — optimum durability, reliability, uniformity, and appearance — and from the standpoint of reducing the costs associated with production — minimized use of raw material, minimized production of material which does not meet specifications, and minimized non-productive machine and manpower time. It is well known in these arts, therefore, to measure for the purposes of control such characteristics as thickness, weight per unit area, density, moisture content, resistivity, and other physical or chemical characteristics of the sheet.

A typical form of such measurement utilizes a gauge mounted for a scanning traversal of the sheet material to measure the characteristic at a plurality of points across the sheet in order to provide a transverse profile of the sheet with respect to the characteristic. From the profile information, an average value of the characteristic across the strip or a portion thereof may be calculated. The average value may be compared to a desired target, and any deviation from the target may be used as the basis of a feedback change in the process to reduce the deviation to zero. U.S. Pat. No. 3,244,881 issued Apr. 5, 1966 to C. W. Hansen et al., and U.S. Pat. No. 3,307,215 issued Mar. 7, 1967 to G. R. Gerhard et al., the latter being assigned to the assignee of the present application, are representative of this type. In the first mentioned patent, wherein a profile of instantaneous sheet thickness across the sheet width is recorded on a strip recorder, an accurate cross direction profile is not obtained because the measurements, due to the fact that they represent merely an instantaneous sampling of thickness and are obtained along an oblique line with respect to the cross direction, are affected by machine direction variations. In the latter patent, in one embodiment of which the profile consists of an average thickness measurement taken across each of several transverse zones, the influence of machine direction variations is somewhat reduced; however, the measurements are also taken along an oblique line. U.S. Pat. No. 3,552,203 issued Jan. 5, 1971 to E. J. Freeh, assigned to the assignee of the present application, describes an embodiment in which thickness averages are accumulated for each of a plurality of zones over a number of scans by a scanning gauge, and a process of interpolation provides an estimation of average thickness at points across the width other than at the centers of the zones, which are assumed to be at an average zonal thickness value. However, the zonal thickness measurements are again taken along an oblique line. Moreover, the interpolation process does not provide an estimated profile between the centers of the outer zones and the edges of the sheet.

While a gauge of the continuously scanning type, capable of providing measurements of the sheet characteristic at a large number of points across the sheet width or a portion thereof has general utility in production control systems of these arts, certain processes demand an alternative form of gauge. For example, where a substantially instantaneous profile of the characteristic is required, a scanning gauge, because of the often substantial period of time needed in which to traverse the sheet, may be inappropriate. A scanning gauge, moreover, can provide a profile of the sheet characteristic only along a line which is oblique to the cross direction of the strip, so that such a profile necessarily reflects components of both cross direction and machine direction. One might, of course, provide a large number of fixed gauges across the sheet width, from whence to derive a cross direction profile; however, the hardware and maintenance costs associated with such a system would be prohibitive.

The present invention offers a unique and accurate alternative to a scanning gauge for the purposes of determining a profile of a material strip with respect to a particular characteristic. Moreover, it offers significant advantages over a scanning gauge system, in that it is capable of providing a substantially instantaneous profile consisting of measurements taken along a line exactly normal to the machine direction. In this way, machine direction variations are practically eliminated as factors affecting a cross direction profile of the material sheet.

The present invention has the further advantage of being adapted for use in a control system in which the use of a scanning gauge would be impractical for reasons of space limitations, difficulties in gauge alignment and calibration, gauge geometry, etc.

Thus the present invention gives an accurate estimation of the profile of a material sheet, which has potential applicability to many types of sheet processing control systems, as will be apparent from a reading of the description which follows.

SUMMARY OF THE INVENTION

A sheet material monitoring apparatus is provided which gives an accurate, quantitative cross direction profile of moving sheet material with respect to a particular sheet characteristic. The apparatus, according to one embodiment of the invention, can provide an operator of the sheet material process with a visual indication of the cross direction profile of the sheet, thus providing a reliable real-time check on whether the desired target value of the characteristic is being maintained. Moreover, the apparatus, according to another embodiment of the invention, provides an output which can be used for feedback or feedforward control over adjustable means for varying the value of the characteristic in the process automatically.

According to one specific embodiment, several single point gauges, preferably at least two in the number, are positioned along a line normal to the machine direction of the moving strip to provide measurements of a desired sheet characteristic. The measurements are individually averaged. A digital computer fits a curve between the separate average indications of the sheet characteristic, using curve-fitting techniques of regression analysis, and computes an estimated value of the sheet characteristic, based on the regression equation, for any cross direction point on the sheet between limits representing the opposite edges of the sheet.

The profile relationship between estimated values of the sheet characteristic and positions across the sheet may be read out in the form of a visual profile on suitable visual display means, whereby the operator of the material process may make adjustments to means for producing or contouring the sheet in order to bring the estimated values of the characteristic to the desired target values.

Alternatively, an output suitable for automatic machine direction control of the process may be provided by integrating the regression equation between limits representing the opposite edges of the sheet to obtain an average value of the characteristic across the sheet, and comparing said average value with a target value. Any deviation of the average value from the target can be applied to a machine direction controller to reduce the deviation to zero. An example of a machine direction controller in the calendering art would be, for example, a calender roll to which equal screwdown is applied to either end.

A further embodiment provides outputs suitable for automatic cross direction control of the process to eliminate substantially any cross direction variations in profile. The regression equation is integrated over limits representing the boundaries of N zones, each representing a longitudinal portion of the strip, to obtain an average value for each zone. The individual zonal average is compared with a zonal target value in each of N separate controllers, whereby the average of said characteristic within each zone is brought to the zonal target value.

Applicant's improved sheet characteristic monitoring apparatus has several clear advantages over the scanning gauge system known in the prior art. The substantial hardware and maintenance costs often associated with the traversing and control mechanisms of the scanning gauge are eliminated. Moreover, single point gauges can often be located at crucial points in the process at which a scanning cauge could not be accommodated due to a lack of space. In addition, the sheet characteristic profile calculated by applicant's apparatus represents an instantaneous profile taken along any desired direction with respect to the machine direction, such as a line exactly normal to the machine direction. In the latter case, the influence of machine direction variations can be substantially eliminated. Furthermore, where a profile or an average value of the sheet characteristic within a particular zone is needed, it will be shown that applicant's apparatus can provide an accurate estimate of such without the necessity of measuring the characteristic within the particular zone. Further advantages and modifications of applicant's invention will be apparent to those skilled within the art.

OBJECTS OF THE INVENTION

Accordingly, it is an object of the present invention to provide an improved sheet characteristic monitoring system, which provides an accurate profile indication of a desired sheet characteristic as a function of points selected along a line normal to the direction of movement of the sheet. It is also an object of the present invention to provide an improved sheet characteristic monitoring system, which provides an accurate profile indication of a desired sheet characteristic substantially instantaneously with the measurement of said characteristic at points along a line normal to the direction of movement of the sheet.

It is another object of the present invention to provide an improved sheet characteristic monitoring system which provides an output, based on an average value of the estimated sheet characteristic which may be used to control said characteristic to a desired machine direction target.

It is a further object of the present invention to provide an improved sheet material characteristic monitoring system which provides outputs representing the average value of the characteristic within each of several longitudinal zones of the sheet, which may be used to control said characteristic to a desired cross direction profile upon comparison of the individual zonal averages with corresponding zonal targets.

Further objects and advantages will become apparent from the following detailed description of the preferred embodiment according to the invention, taken in conjunction with the appended drawings.

BRIEF DESCRIPTION OF THE FIGURES

FIG. 6 is a flow chart of the steps performed in deriving the transverse data profile of a material characteristic, according to the invention.

FIG. 7 is a flow chart of the steps performed in evaluating a regression equation to provide zonal average indications of a material characteristic, according to the embodiment of the invention shown in FIG. 3.

SHEET MATERIAL PROCESS

Applicant's invention has general applicability to any process involving the manufacture of sheet material, such as, for example, paper making, steel rolling, rubber and plastic calendering, sheet coating, etc., in which one or more specific characteristics of the sheet are monitored by measuring gauges for the purpose of maintaining the characteristics at a desired value. In essence, the invention provides a unique apparatus for estimating a cross direction profile of the material sheet with respect to a particular characteristic, such as thickness, weight per unit area, moisture content, resistivity, or other physical or chemical characteristics, without using a gauge of the type which scans across the sheet.

Figure 1:
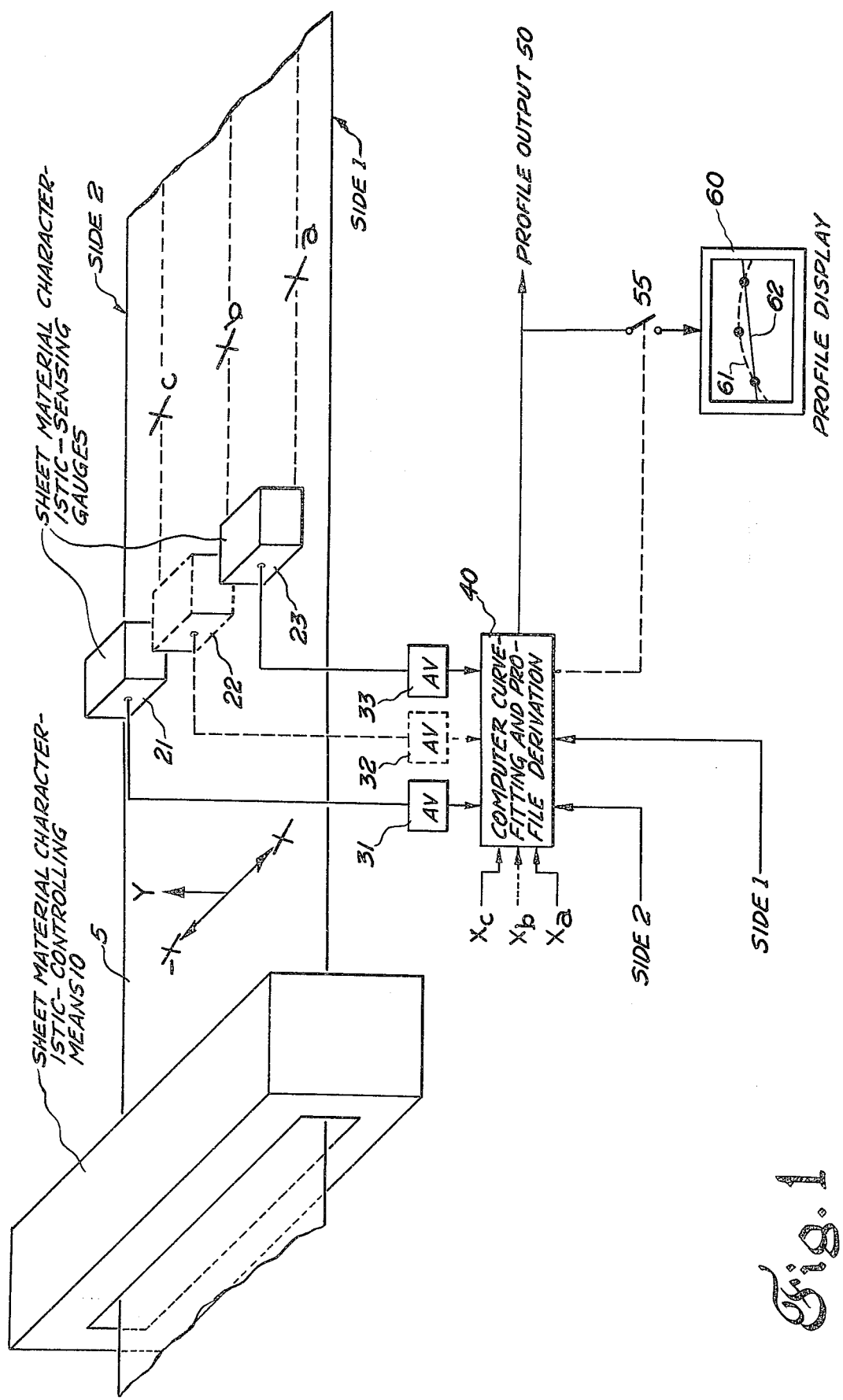
FIG. 1 is a partially perspective and a partially schematic view of a sheet material process, in combination with an improved sheet material characteristic monitoring system according to the invention.

Referring to FIG. 1, a means for effecting a change in a sheet material characteristic is illustrated in a general fashion by sheet material characteristic-controlling means 10, which may represent for example, the adjustable stock valve for basis weight control in a paper making machine, the adjustable screwdown to calender rolls in a calendering or milling process, or control of a coating element on a coating machine.

CHARACTERISTIC-SENSING GAUGES

To derive information relating to the desired sheet material characteristic, from which a continuous cross direction profile of said characteristic may be computed, a plurality of single point gauges are arranged at spaced intervals along a line normal to the direction of the moving sheet. As seen in FIG. 1, at least two stationary sensing gauges, shown here as gauges 21 and 23, are required, for reasons to be explained below. According to a preferred embodiment, three stationary characteristic-sensing gauges, gauges 21, 22, and 23, are employed, being spaced at equal intervals across substantially the entire width of the strip. One or more gauges can be movable to another stationary position for other measurements. The simultaneous measurement at each point by fixed gauges has certain advantages.

While it is not necessary that the gauges be spaced at equal intervals, or that they be arranged across substantially the entire width of the sheet, such an arrangement permits a more representative sampling of the sheet material characteristic. It should further be understood that the geometrical relationship between the sensing gauges and the direction of movement of the sheet material is determined by the particular desired geometrical orientation of the characteristic profile with respect to the direction of sheet movement. For example, should other than a cross direction profile of the characteristic be desired, the alignment of the sensing gauges 21, 22, and 23 may be altered appropriately.

Gauges 21, 22, and 23 may be of any known type for suitably sensing the particular characteristic in a sheet or layer of material moving relative to them.

In a preferred embodiment, the respective indications of the sheet characteristic is measured by gauges 21, 22, and 23, are averaged over time in averaging means 31, 32, and 33, to smooth out the presence of localized, slight variations in the characteristic to obtain a truer representation of the characteristic over the measured portion of the sheet. As an alternative, however, the indications from gauges 21, 22, and 23 may be sampled instantaneously, where averaging is deemed not necessary or desirable.

The considerations which determine the number of single point gauges to be used include the degree of accuracy required in the calculated profile and the cost factors associated with such gauges. Where only a general indication of the cross direction profile is needed, two single point gauges may suffice, and the curve will actually be in the form of a straight line passing through the respective values of the sheet characteristic indicated by each gauge. According to one preferred embodiment, three fixed single point gauges are employed, one of which is situated in the center of the sheet, the other two being situated adjacent the opposite edges of the sheet. A curve fitted to the three indications provided by these gauges is assumed to be in the form of a parabola. For most practical purposes, this form of curve will permit an accurate and useful profile indication, because it will reveal the most typically encountered varieties of sheet material profile: crown (raised center portion), dish (lowered center portion), or skew (slanting from one side to the other). If an even more accurate determination of profile requires the use of more than three single point gauges, a curve fit to them will, in most cases, not contain each distinct measured value as a point thereon, as in the case of a two or three gauge configuration, but will represent a more general least-squares approximation.

PROFILE DERIVATION

A digital computer 40 fits a curve between the separate indications of the sheet characteristic provided by gauges 21, 22, and 23 at their respective cross direction positions $x_c$, $x_b$, and $x_a$, respectively. The mathematical techniques of regression analysis in general appear in various texts, among which *Applied Regression Analysis* by N. R. Draper and H. Smith is illustrative. Where two gauges are used, the regression equation is linear and has the form of a first degree polynominal, $Y = Ax + B$, for which estimated values of the constants A and B are computed. Variable Y represents the estimated value of the characteristic at a location $x$ across the strip width (refer to FIG. 1).

For three gauges, the regression equation assumes the form of a second degree polynominal, $Y = Ax^2 + Bx + C$, for which estimated values of the constants, A, B, and C are computed. When the regression equation for a particular set of data points has been determined, values of the dependent variable Y, representing the sheet characteristic, may be readily estimated for any desired value of the independent variable $x$, representing cross direction position on the sheet. Predetermined limits on $x$, representing the opposite edges of the sheet, serve to limit the range of possible values of the sheet characteristic to those corresponding to actual positions on the sheet. As will be seen below, the calculated regression equation may be evaluated between other predetermined limits which represent the boundaries of selected longitudinal zones on the sheet, which zones may or may not overlap.

Figure 4:
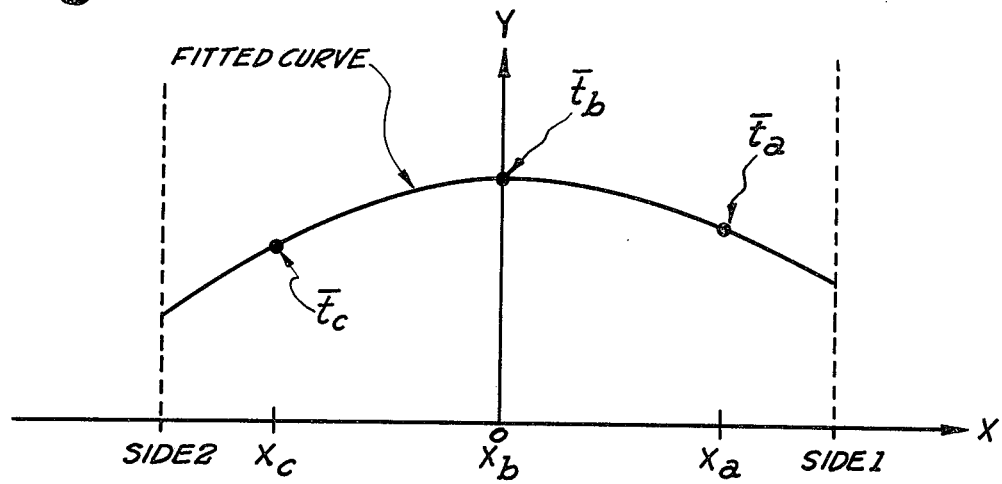
FIG. 4 is a graph of a characteristic versus material width, illustrating a curve fit between three measured points across the width of a material sheet, according to the embodiments of the invention shown in FIGS. 1 and 2.

The derivation of a regression equation for a preferred embodiment, involving measurements of the sheet characteristic at three points, will now be given, referring to FIGS. 1 and 4. As seen in FIG. 1, measurements of the characteristic are obtained at points $x_a$, $x_b$, and $x_c$ corresponding to gauges 23, 22, and 21, respectively. The individual measurements are averaged in respective averaging means 33, 32, and 31 to provide average indications of the characteristic $\bar{t}_a$, $\bar{t}_b$, and $\bar{t}_c$ corresponding to the points $x_a$, $x_b$, and $x_c$ (refer to FIG. 4, wherein the dotted lines represent the sheet edges, and the dots represent the average indications of the characteristic at the corresponding transverse sheet positions).

A second order curve $Ax^2 + Bx + C$, is to be fit to the three data pairs $(\bar{t}_a, x_a)$, $(\bar{t}_b, x_b)$, and $(\bar{t}_c, x_c)$. The coefficients A, B, and C are found as follows: Given,
$$Y = Ax^2 + Bx + C$$
and substituting
$$X = 0, C = Y(0) = \bar{t}_b$$
Evaluating Y at $x_c$,
$$Y(x_c) = \bar{t}_c = A(x_c)^2 + B(x_c) + \bar{t}_b$$
Evaluating Y at $x_a$,
$$Y(x_a) = \bar{t}_a = A(x_a)^2 + B(x_a) + \bar{t}_b$$
Solving simultaneous equations,
$$\bar{t}_c + \bar{t}_a = A[(x_c)^2 + (x_a)^2] + B(x_c + x_a) + 2\bar{t}_b$$

$$A = \frac{\bar{t}_c + \bar{t}_a - B(x_c + x_a) - 2\bar{t}_b}{(x_c)^2 + (x_a)^2}$$

Solving the equation
$$\bar{t}_c = A(x_c)^2 + B(x_c) + \bar{t}_b$$
for B, $$B = \frac{-A(x_c)^2 + \bar{t}_c - \bar{t}_b}{x_c}$$

Substituting A from above, $$B = \frac{\frac{-(\bar{t}_c + \bar{t}_a - B(x_c + x_a) - 2\bar{t}_b)}{(x_c)^2 + (x_a)^2}(x_c)^2 + \bar{t}_c - \bar{t}_b}{x_c}$$

which reduces to
$$B = -\frac{(x_c)^2 (\bar{t}_a - \bar{t}_b) + (x_a)^2 (\bar{t}_b - \bar{t}_c)}{(x_c)(x_a)(x_a - x_c)}$$

Substituting the expression for B into the expression for A and reducing yields:

$$A = \frac{x_a(\bar{t}_b - \bar{t}_c) + x_c(\bar{t}_a - \bar{t}_b)}{(x_a)^2 (x_c) - (x_c)^2 (x_a)}$$

Independent variables $x_a$, $x_b$ and $x_c$ are stored in computer 40 and, together with the separate averages of the dependent variables $\bar{t}_a$, $\bar{t}_b$, and $\bar{t}_c$, are used to solve the above equations for A, B, and C. Once the coefficients A, B, and C are calculated, the regression equation $Y = Ax^2 + Bx + C$ may be evaluated for values of x between opposite sides of the sheet in order to output estimated values Y of the sheet characteristic across the sheet width. To this end, limit values of x, shown in FIG. 1 as "Side 1" and "Side 2", which represent the boundaries over which the regression equation is to be evaluated, are read into computer 40 as constants, which may be updated for a product change. The profile output 50, comprising a set of estimated values of the sheet characteristic over the sheet width, may be used for display and/or control purposes, as explained below.

Reference may be had to the flow chart of FIG. 6 for an understanding of the sequencing of the curve-fitting and profile computations performed by computer 40.

For the more general case, in which more than three measurement positions are involved, a least squares method of computing the regression equation coefficients may be employed. To illustrate the application of this method, a matrix solution for computing the coefficients required for an estimation of profile for an $n$-point system will now be described.

Letting $\bar{t}_i$ denote the $i$th average characteristic measurement, and $x_i$ denote the corresponding position of this measurement across the sheet width, with $i=1, \ldots, n$, the second order curve $Ax^2 + Bx + C$ is fitted to the $n$ data pairs $(\bar{t}_i, x_i)$, where $i=1, \ldots, n$.

Utilizing a matrix solution to solve for the coefficients A, B, and C, a vector $m$ is defined to represent the desired coefficients,
$$m = [A, B, C]^T,$$
where T indicates the transpose of the vector for purposes to be seen below.

A vector Y is defined to represent the n average measurements,
$$Y = [\bar{t}_1, \ldots, \bar{t}_n]^T,$$
this vector also being expressed in transpose form.

A matrix $\bar{X}$ is written to represent the independent variables, $$\bar{X} = \begin{bmatrix} x_1^2 & x_1 & 1 \\ x_2^2 & x_2 & 1 \\ \cdot & \cdot & \cdot \\ \cdot & \cdot & \cdot \\ x_n^2 & x_n & 1 \end{bmatrix}$$

The least squares estimate of A, B, and C is then given by a solution of the equation,
$$m = [A, B, C]^T = (\bar{X}^T \bar{X})^{-1} \bar{X}^T Y$$
where $^{-1}$ indicates the inverse of a matrix. The derivation and application of the above matrix equation with respect to least squares solutions to regression problems is described in detail in the aforementioned Applied Regression Analysis, pp. 44–53, 128–130.

Once derived, the coefficients are set into the regression equation, estimated values of the sheet characteristic are calculated between desired limits, and the profile is output, as before.

PROFILE EVALUATION FOR PROCESS CONTROL

Once derived, the regression equation representing the estimated characteristic profile may be evaluated in a number of ways, the proper choice of which will be dependent upon the particular purposes for which information relating to the sheet characteristic is required. The versatility of applicant's invention with respect to the utilization of the derived profile information is shown below, where various embodiments, which are merely illustrative, are described in which the profile information is used for different control purposes.

The embodiment shown in FIG. 1 illustrates a process control system in which a process control operator makes adjustments to the system based on a visual display of profile information to him.

Figure 2:
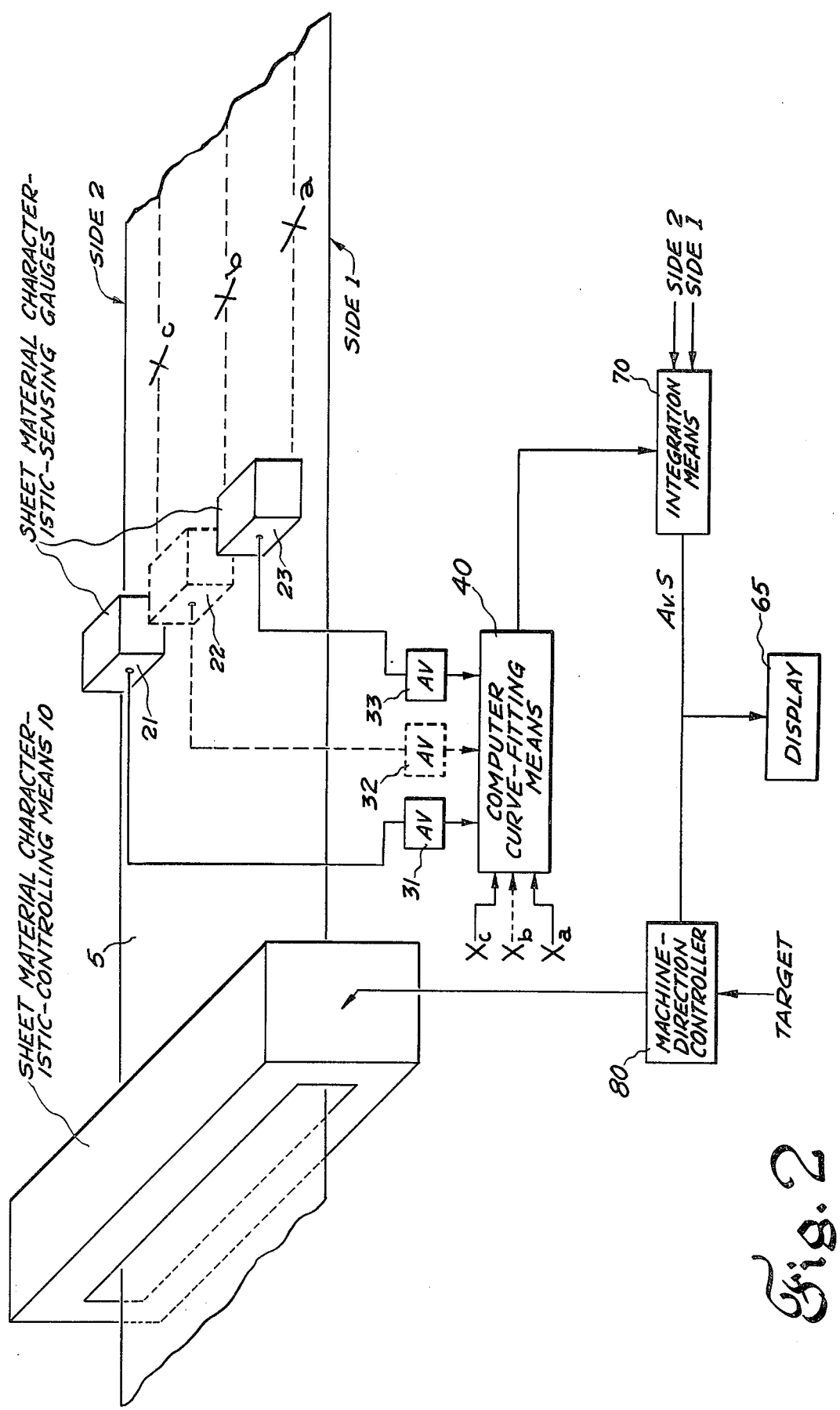
FIG. 2 is a partially perspective and a partially schematic view of a sheet material process, in combination with an improved sheet material characteristic monitoring and machine direction control system, according to the invention.
Figure 3:
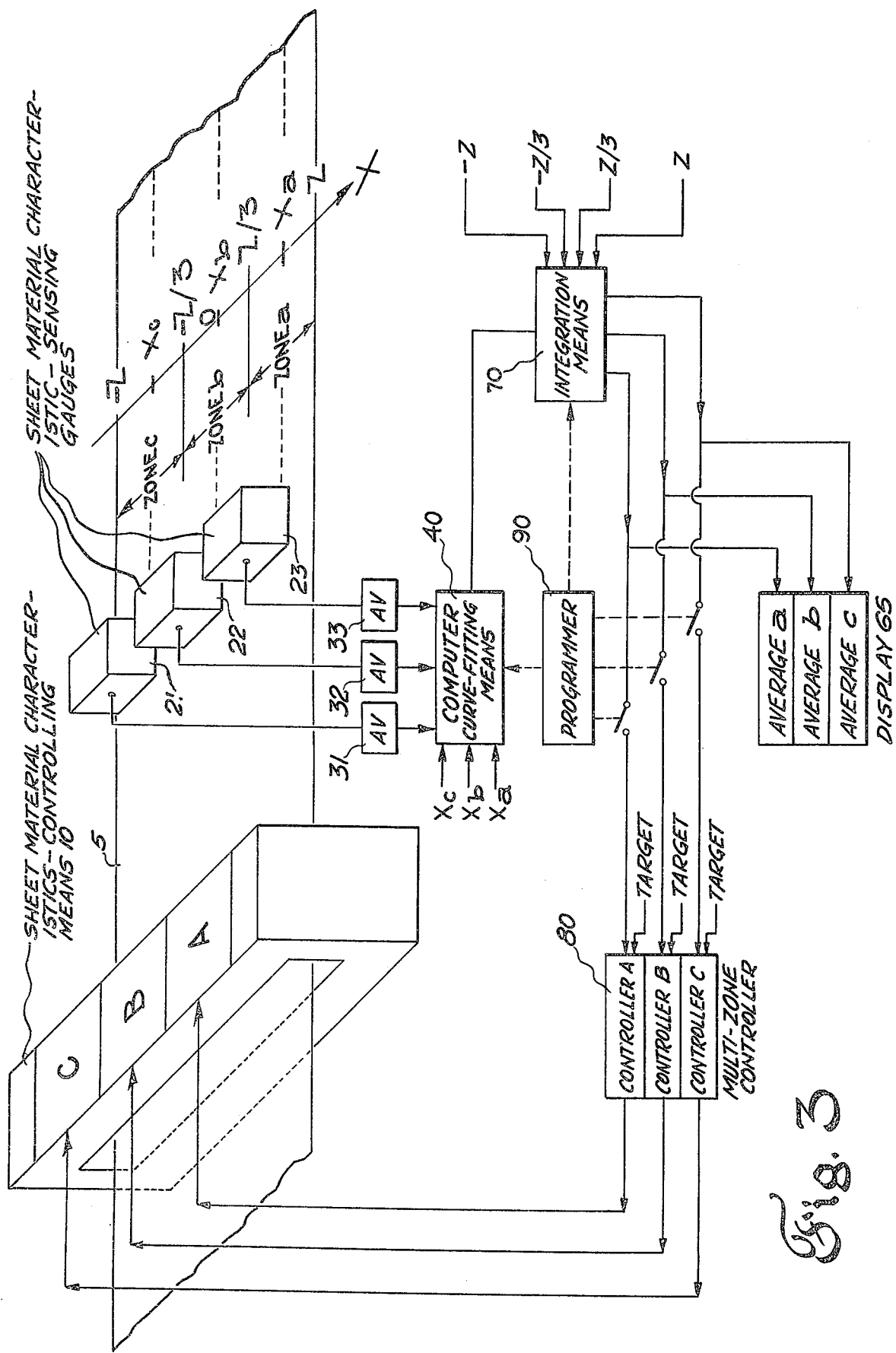
FIG. 3 is a partially perspective and a partially schematic view of a sheet material process, in combination with an improved sheet material characteristic monitoring and cross direction control system, according to the invention.

To make an estimated cross direction sheet characteristic profile immediately available to the process control operator, it may be read out of computer 40 upon the closing of switch 55 by computer 40, into a suitable analog display device 60, such as a strip recorder, oscilloscope, or the like, after suitable processing if necessary, by digital-to-analog converter means (not shown). Profile curve 62 represents a straight line profile such as might be obtained by fitting a curve between data measurements obtained at the points $x_a$ and $x_b$, while profile curve 61 represents a second-order curve, in the form of a parabola, of the type attainable through a curve fit between data measurements from the three points $x_a$, $x_b$, and $x_c$. Having available to him an accurate, instantaneously derived cross direction profile of the sheet characteristic, the process operator can at all times maintain the process within prescribed tolerances.

Where outputs suitable for automatic control over the process are preferred, the embodiments shown in FIGS. 2 and 3 are illustrative of two possible types — machine direction control and cross direction control. These should not be taken as limiting, but they should be considered merely as suggestive of the manner in which applicant's invention may be utilized in conjunction with the automatic control of a sheet process.

According to the embodiment depicted in FIG. 2, the regression equation calculated by means of digital computer 40, is integrated in integration means 70 between limits representing the opposite edges of the sheet to obtain an average value of the characteristic across the sheet, $Av.S$. Integration means 70 performs an integration of the form, $$Av.\,S = \frac{1}{w} \int_{-\frac{w}{2}}^{\frac{w}{2}} (Ax^2 + Bx + C)\,dx$$

where $w$ is the width of the sheet.

The average value of the characteristic $Av.S$ may be displayed if desired in display means 65. A machine direction controller 80 receives as inputs the average value of the characteristic $Av.\,S$ and a target representing the desired value of the characteristic. Any deviation of the average value from the target value causes an appropriate corrective adjustment to be made uniformly across the width of the sheet by sheet material profile-determining means 10, until the deviation is reduced essentially to zero.

Referring now to the embodiment shown in FIG. 3, strip 5 is divided into longitudinal zones, for example three: zones $a$, $b$, and $c$. Each of the sensing gauges 21, 22, and 23 is positioned within a particular zone at such a location as to obtain a representative measurement of the sheet characteristic within that zone. The individual measurements from the sensing gauges are averaged and curve-fitted, as described hereinabove. Integration means 70 integrates the calculated regression equation between predetermined limits representing the opposite edges of each longitudinal zone, under the sequencing control of programmer 90. Programmer 90 sequentially reads the corresponding limits for each longitudinal zone into integration means 70 to derive, in turn, an expression of the average value of the characteristic over each longitudinal zone $a$, $b$, and $c$.

Figure 5:
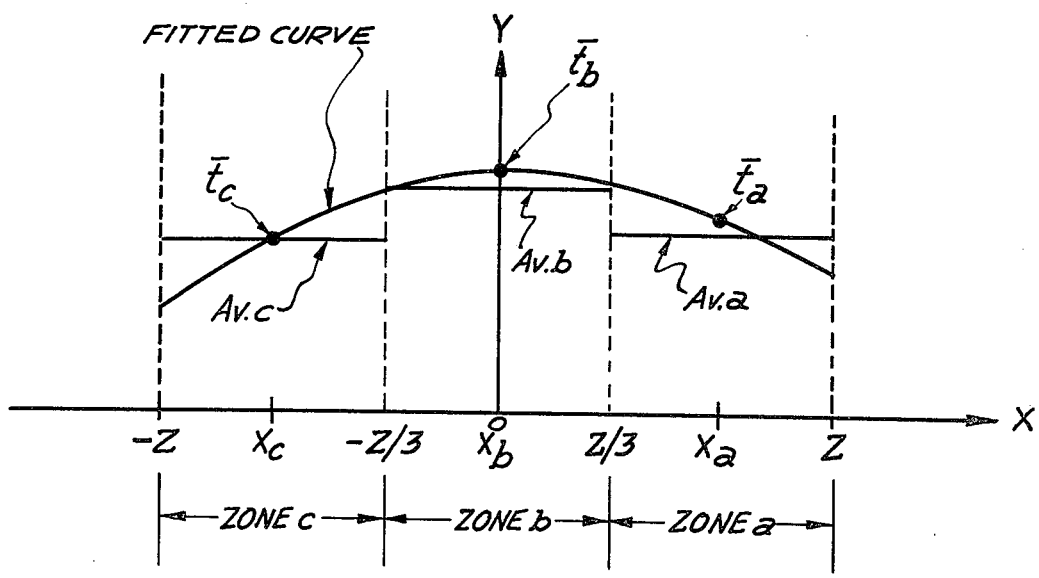
FIG. 5 is a graph of a characteristic versus material width, illustrating a curve fit between three measured points, each of which lies within a different longitudinal zone of a material sheet, and showing the average value of the characteristic for each zone, according to the embodiment of the invention shown in FIG. 3.

Referring now to FIGS. 3 and 5, the calculation of the average value of the characteristic over one zone, say zone $a$, will be described. The edges of zone $a$ are represented by discrete values of $x$, namely $Z/3$ and $Z$, which are read into integration means 70 as the limits of integration. The actual integration is represented by:

$$Av.\,a = \frac{3}{2Z} \int_{\frac{Z}{3}}^{Z} (Ax^2 + Bx + C)\,dx$$

where $2Z$ is the total sheet width, and A, B, and C are calculated as above. The computations for zones $b$ and $c$ are similar, the only difference being the choice of limits.

Reference may be had to the flow chart of FIG. 7 for the sequencing of the zonal average computations performed by integration means 70.

Under the control of programmer 90, the individual zonal average indications are read into individual units of a multi-zone controller 80. Multi-zone controller 80 comprises a number of independent zone-controlling elements A, B, and C, the number of which may correspond to the number of longitudinal zones into which the material strip 5 is subdivided. Each zone-controlling element receives as inputs the respective zonal average of the sheet characteristic and a zonal target value. For example, controller element A compares $Av.\,a$ with a target for the same zone and outputs a correction to zone $a$ of the sheet. Corrections may be made to zones $b$ and $c$ in like manner. It should be clear that in the event the number of individual zone-controlling elements in zone controller 80 exceeds the number of single point gauges, and the sheet is accordingly subdivided into a greater number of zones than the number of gauges, an estimation of cross direction profile and the average of such within certain zones will be provided without the necessity in fact of taking measurements within these zones.

Alternatively, for the purpose of cross direction control, the individual zonal averages may each be compared with the overall average of the sheet characteristic across the width of the sheet, in the manner described in the aforementioned U.S. Pat. No. 3,307,215.

As an alternative to the independent control of each zone by separate zone-controllers, a single controller may calculate the separate corrections for each zone taking into account the interactive effects of separate adjustments in the process, based on the knowledge that in certain processes an adjustment to a particular zone will have an effect on some or all of the other zones. This technique of process control, known as "interactive control", is discussed in U.S. Pat. No. 3,599,288, issued Aug. 17, 1971 to S. L. Eakman.

While several embodiments of the invention have been shown and described, including a preferred embodiment, it will be apparent to one skilled in the art that numerous modifications may be made thereto without departing from the scope and intent of the invention as recited in the appended claims. For example, the averaging, curve fitting, integrating, sheet controlling, and programming functions may be carried out by means of a single digital computer.

It should be emphasized that the discrete measurements of the sheet characteristic made at fixed points across the sheet may be obtained by means of one or more movable gauges. For example, in the three point embodiment shown in FIG. 3, one gauge may be of the movable type to provide an average measurement at each of two points, say $x_a$ and $x_b$, across a transverse dimension of the strip at different times, while another gauge, of the fixed point type, may provide an average measurement at the third point $x_c$. The employment of a movable gauge for these purposes may find application in a monitoring system not requiring an instantaneous profile, as, for example, in a system of the type described in the aforementioned co-pending application entitled "Process Control System" of J. Donoghue et al., in which measurements from stationary positions are derived and averaged over a time period.

It will further be clear, with respect to the embodiments shown in FIGS. 2 and 3, that the targets need not remain fixed, but may be altered according to the statistical variance of the measured characteristic, in the manner disclosed in U.S. Pat. No. 3,515,860, issued June 2, 1970, to C. T. Fitzgerald, Jr., and assigned to the same assignee as the present application. By the application of this technique, known as "Target Optimization Control", the degree of controllability of the process is automatically sensed and the process is automatically operated closer to or further from a predetermined target value of the characteristic, depending on the controllability of the process.

In addition, it should be obvious with respect to the embodiment shown in FIG. 3, that the targets for each longitudinal zone need not be identical to one another if other than a flat profile is desired.

Although various embodiments have been shown and described relating to feedback control over a process, the invention has equal applicability to process control systems utilizing feedforward control, in which adjustments are made to a process control element based on profile measurements obtained upstream in the process.

I claim:

1. A method of controlling a machine direction characteristic of a sheet comprising measuring a property of a sheet related to the characteristic at a plurality of locations across the sheet to derive an indication of the property at each of a plurality of discrete, spaced cross sheet points, responding to the indications and a predetermined mathematical expression relating values of the property to cross direction location to derive a signal representing a continuous, analytic equation that approximates the values of the property as a function of cross direction location substantially across the entire sheet width, deriving a machine direction control indication by integrating the signal representing the equation over a cross direction interval of the sheet that is substantially across the entire sheet width, and controlling the characteristic uniformly across the sheet width in response to the control indication.

2. The method of claim 1 wherein the property is measured at three different cross sheet points, and the equation is of the form
$$Y = Ax^2 + Bx + C$$
where:
  $x =$ cross sheet location,
  $Y =$ the approximated value of the property at any cross sheet location $x$, and
  A, B and C are values of the sheet property as determined for the three points.

3. The method of claim 1 wherein the property is measured by maintaining gauge means for the property relatively stationary at the same cross sheet locations for a substantial time duration, and averaging responses from the stationary gauge means over the duration to derive the property indication at each of the points.

4. A method of controlling a cross direction characteristic of a sheet comprising measuring a property of the sheet related to the characteristic at a plurality of locations across the sheet to derive an indication of the property at each of a plurality of discrete, spaced cross sheet points, responding to the indications and a predetermined mathematical expression relating values of the property to cross direction location to derive a signal representing a continuous, analytic equation that approximates the values of the property as a function of cross direction location substantially across the entire sheet width, deriving a cross direction control indication by separately integrating the signal representing the equation over a plurality of zones extending across the sheet, adjacent one of the said zones having abutting boundaries and each of said zones including one of said points, in response to the separate integration in each of the zones deriving a separate control indication for each of the zones, and activating a controller for the sheet characteristics in each of the zones in response to the separate indications for each of the zones.

5. The method of claim 4 wherein the property is measured at three different cross sheet points, and the equation is in the form
$$Y = Ax^2 + Bx + C$$
where:
  $x =$ cross sheet location,
  $Y =$ the approximated value of the property at any cross sheet location $x$, and
  A, B and C are values of the sheet property as determined for the three points.

6. The method of claim 4 wherein the property is measured by maintaining gauge means for the property relatively stationary at the same cross sheet locations for a substantial time duration, and averaging responses from the stationary gauge means over the duration to derive the property indication at each of the points.

7. The method of claim 1 wherein the property is measured a $n$ different cross sheet points, where $n$ is an integer greater than 1 and the equation is a polynomial of the form
$$Y = A_{n-1}x^{n-1} + A_{n-2}x^{n-2} + \ldots + A_1x + A_0$$
where:
  $x =$ cross sheet location,
  $Y =$ the approximated value of the property at any cross sheet location $x$, and
  $A_{n-1}, A_{n-2} \ldots A_1$ and $A_0$ are values of the sheet property as determined for the $n$ points.

8. The method of claim 4 wherein the property is measured at $n$ different cross sheet points, where $n$ is an integer greater than 1 and the equation is a polynomial of the form
$$Y = A_{n-1}x^{n-1} + A_{n-2}x^{n-2} + \ldots + A_1x + A_0$$
where:
  $x =$ cross sheet location,
  $Y =$ the approximated value of the property at any cross sheet location $x$, and
  $A_{n-1}, A_{n-2} \ldots A_1$ and $A_0$ are values of the sheet property as determined for the $n$ points.

9. The method of claim 8 wherein the property is measured by maintaining gauge means for the property relatively stationary at the same cross sheet locations for a substantial time duration, and averaging responses from the stationary gauge means over the duration to derive the property indication at each of the points.

10. The method of claim 7 wherein the property is measured by maintaining gauge means for the property relatively stationary at the same cross sheet locations for a substantial time duration, and averaging responses from the stationary gauge means over the duration to derive the property indication at each of the points.

11. An apparatus for deriving an output signal useful in the control of a machine direction or cross direction characteristic of a sheet comprising means for measuring a property of the sheet related to the characteristic at a plurality of locations across the sheet to derive a first signal indicative of the property at each of a plurality of discrete, spaced cross sheet points, means for storing a second signal indicative of a predetermined mathematical expression relating values of the property to cross direction location, means responsive to the first and second signals for deriving a third signal representing a continuous, analytic equation that approximates the values of the property as a function of cross direction location substantially across the entire sheet width, and means responsive to the signal representing the equation for integrating the signal over a cross direction interval of the sheet to derive the output signal.

12. The apparatus of claim 11 wherein the machine direction characteristic is controlled and the cross direction interval is substantially across the entire sheet width, and means responsive to the output signal for controlling the characteristic uniformly across the sheet width.

13. The apparatus of claim 12 wherein the measuring means includes means for measuring the property at three different cross sheet points, and the equation if of the form
$$Y = Ax^2 + Bx + C$$
where
 $x =$ cross sheet location,
 $Y =$ an estimated value of the property at any cross sheet location $x$, and
 A, B and C are values of the sheet property as determined for the three points.

14. The apparatus of claim 12 wherein the measuring means includes gauge means for the property maintained relatively stationary at the same cross sheet locations over a substantial time duration, and means for averaging responses from the stationary gauge means over the direction to derive the property indication at each of the points.

15. The apparatus of claim 11 wherein the cross direction characteristic is controlled and the signal representing the equation is separately integrated in a plurality of zones extending across the sheet, adjacent ones of said zones having abutting boundaries and each of said zones including one of said points, means responsive to the separate integrated signal in each of the zones for deriving a separate control signal for each of the zones, and means for activating a separate controller for the sheet characteristics in each of the zones in response to the separate control signal for each of the zones.

16. The apparatus of claim 15 wherein the measuring means includes means for measuring the property of three different cross sheet points, and the equation is of the form:
$$Y = Ax^2 + Bx + C$$
where:
 $x =$ cross sheet location,
 $Y =$ an estimated value of the property of any cross sheet location $x$, and
 A, B and C are values of the sheet property as determined for the three points.

17. The apparatus of claim 15 wherein the measuring means includes gauge means for the property maintained relatively stationary at the same cross sheet locations over a substantial time duration, and means for averaging responses from the stationary gauge means over the direction to derive the property indication at each of the points.

18. The apparatus of claim 11 wherein the measuring means includes means for measuring the property at three different cross sheet points, and the equation is of the form:
$$Y = Ax^2 + Bx + C$$
where:
 $x =$ cross sheet location,
 $Y =$ an estimated value of the property at any cross sheet location $x$, and
 A, B and C are values of the sheet property as determined for the three points.

19. The apparatus of claim 11 wherein the measuring means includes gauge means for the property maintained relatively stationary at the same sheet locations over a substantial time duration, and means for averaging responses from the stationary gauge means over the direction to derive the property indication at each of the points.

20. The apparatus of claim 11 wherein the measuring means includes means for measuring the property of $n$ different cross sheet points, where $n$ is an integer greater than 1 and the equation is a polynomial of the form
$$Y = A_{n-1}x^{n-1} + A_{n-2}x^{n-2} + \ldots + A_1x + A_0$$
where:
 $x =$ cross sheet location,
 $Y =$ the approximate value of the property at any cross sheet location $x$, and
 $A_{n-1}, A_{n-2} \ldots A_1$ and $A_0$ are values of the sheet property as determined for the $n$ points.

21. A method of using apparatus for deriving an output signal useful in the control of a machine direction or cross direction characteristic of a traveling sheet, said apparatus comprising first means for measuring a property of the sheet related to the characteristic at a plurality of locations across the sheet, second means for storing signals, third means responsive to signals, and fourth means responsive to signals, comprising the steps of said first means deriving a first signal indicative of the property at each of a plurality of discrete, spaced cross sheet points, said second means storing a second signal indicative of a predetermined mathematical expression relating values of the property to cross direction location, said third means responding to the first and second signals for deriving a third signal representing a continuous, analytic equation that approximates the values of the property as a function of cross direction location substantially across the entire sheet width, said fourth means responding to the signal representing the equation for integrating the signal over a cross direction interval of the sheet to derive the output signal.

22. The apparatus of claim 21 wherein the sheet machine direction characteristic is controlled and the cross direction interval is substantially across the entire sheet width, and wherein said apparatus further comprises fifth means, said fifth means responding to the output signal for controlling the characteristic uniformly across the sheet width.

23. The apparatus of claim 22 wherein the first measuring means includes means for measuring the property at three different cross sheet points, and said third means equation is of the form $$Y = Ax^2 + Bx + C$$

where:
- $x$ = cross sheet location,
- $Y$ = an estimated value of the property at any cross sheet location $x$, and
- A, B and C are values of the sheet property as determined for the three points.

24. The apparatus of claim 22 wherein the first measuring means includes gauge means for the property maintained relatively stationary at the same cross sheet locations over a substantial time duration, means for averaging responses from the stationary gauge means over the direction to derive the property indication at each of the points.

25. The apparatus of claim 21 wherein the sheet cross direction characteristic is controlled and the signal representing the equation is separately integrated in a plurality of zones extending across the sheet, adjacent ones of said zones having abutting boundaries and each of said zones including one of said points, said apparatus comprising fifth means responsive to the separate integrated signal in each of the zones for deriving a separate control signal for each of the zones, and sixth means for activating a separate controller for the sheet characteristics in each of the zones in response to the separate control signal for each of the zones.

26. The apparatus of claim 21 wherein the first measuring means includes means for measuring the property of $n$ different cross sheet points, where $n$ is an integer greater than 1 and the equation is a polynomial of the form $$Y = A_{n-1}x^{n-1} + A_{n-2}x^{n-2} + \ldots + A_1 x + A_0$$

where:
- $x$ = cross sheet location,
- $Y$ = the approximate value of the property at any cross sheet location $x$, and
- $A_{n-1}, A_{n-2} \ldots A_1$ and $A_0$ are values of the sheet property as determined for the $n$ points.

* * * * *